United States Patent [19]
Zweighaft

[11] Patent Number: 5,829,702
[45] Date of Patent: Nov. 3, 1998

[54] METHOD AND APPARATUS FOR COUNTERACTING INTERLAYER SLIP IN MAGNETIC TAPE DRIVE

[75] Inventor: James Zweighaft, Boulder, Colo.

[73] Assignee: Exabyte Corporation, Boulder, Colo.

[21] Appl. No.: 825,025

[22] Filed: Mar. 26, 1997

[51] Int. Cl.⁶ .......................... G11B 15/46; G11B 23/42
[52] U.S. Cl. .................. 242/334.6; 242/334.2; 242/334.3; 360/71
[58] Field of Search ........................ 242/334.2, 334.3, 242/334.6, 420.5, 420.6; 360/71; 318/6

[56] References Cited

U.S. PATENT DOCUMENTS

| | | | |
|---|---|---|---|
| 3,648,950 | 3/1972 | Grabl | 318/6 X |
| 3,809,335 | 5/1974 | Mantey | 242/334.6 |
| 3,982,160 | 9/1976 | Goldschmidt et al. | 318/7 |
| 4,084,116 | 4/1978 | Arter et al. | 318/6 |
| 4,389,600 | 6/1983 | Milligan et al. | 318/6 |
| 4,633,333 | 12/1986 | Blanco et al. | 360/31 |
| 4,786,992 | 11/1988 | Tajima et al. | 360/73 |
| 5,039,027 | 8/1991 | Yangihara et al. | 242/334.6 X |
| 5,602,694 | 2/1997 | Miles et al. | 360/84 |

*Primary Examiner*—John Q. Nguyen
*Attorney, Agent, or Firm*—Nixon & Vanderhye, P.C.

[57] ABSTRACT

Method and apparatus are provided for counteracting tape interlayer slip in a magnetic tape drive (20) which has a swingarm (84) in a tape path between a tape supply reel and a tape take-up reel. So long as an interlayer slip is not detected, a reel motor (30) for the tape supply reel is driven in accordance with a primary strategy related to a position of the swingarm (84). Upon detection of the interlayer slip, the reel motor (30) is driven in accordance with a secondary strategy. In a first embodiment, the secondary strategy depends on the velocity of the reel motor; in a second embodiment, the secondary strategy depends on the velocity of the reel motor and the swingarm average position.

15 Claims, 4 Drawing Sheets

METHOD AND APPARATUS FOR COUNTERACTING INTERLAYER SLIP IN MAGNETIC TAPE DRIVE

BACKGROUND

1. Field of Invention

This invention pertains to magnetic tape drives, and particularly to method and apparatus for counteracting tape interlayer slip which can occur in magnetic tape drives.

2. Related Art and Other Considerations

In magnetic recording on tape using a magnetic tape drive, relative motion between a head unit (typically with both a write element and a read element) and the tape causes a plurality of tracks of information to be transduced with respect to the tape. The magnetic tape is often housed in a cartridge which is loaded into the tape drive. The tape extends between a cartridge supply reel (sometimes fixed in the drive) and a cartridge take-up reel. The cartridge supply reel fits over a supply reel spindle which is rotated by a supply reel motor of the drive. Similarly, the cartridge take-up reel fits over a take-up reel spindle which is rotated by a take-up reel motor of the drive.

After the cartridge is loaded into the tape drive, the tape is extracted by mechanisms in the drive so that a segment of the tape is pulled from the cartridge and into a tape path that travels proximate the head unit. The tape path is defined by a plurality of guides, typically at least some of which move into position and serve as tape extracting mechanisms as the tape is extracted. Some tape drives have a moveable swingarm, usually situated near the supply reel, which serves to monitor tension in the tape path.

Once the tape is extracted into the tape path, the tape can be transported past the head unit, e.g., by activation of a capstan and/or the supply reel and take-up reel motors, depending upon the particular type of transport mechanisms employed. As the tape is transported past the head unit, information can be transduced to or from the tape by the tape drive in recording and reading operations, respectively. A capstanless tape drive, particularly a tape drive which utilizes helical scan recording, is shown in U.S. Pat. No. 5,602,694 for CAPSTANLESS HELICAL DRIVE SYSTEM to Robert J. Miles and James Zweighaft, which is incorporated herein by reference.

Various undesirable phenomena related to tape tension can occur. One phenomena is a "tape loop." A tape loop occurs when too much tape is put into the tape path. Another phenomena is known as "interlayer slip." Interlayer slip is slippage between the hub of either reel and the outermost layers of tape wrapped upon that reel. Interlayer slip, like tape loop, results in a momentary loss of tape tension. Furthermore, interlayer slip changes the tape path dynamics so drastically that the control system responds in an inappropriate manner, effectively making a bad situation worse. The loss of tension resulting from an interlayer slip is typically fatal (i.e., causes the tape drive to shut down).

In view of the seriousness of interlayer slip, special devices known as tape conditioners have been developed. Tape conditioners essentially unwind and rewind the tape in an effort to ensure that the tape is packed tightly on a reel. Further, some drives seek to control pecularily affected reels in an intertape slip condition. See, for example, U.S. Pat. No. 4,389,600 to Milligan et al.

What is needed, and an object of the present invention, is an effective method and apparatus for counteracting inter-tape slip, particularly in a tape drive which has a swingarm in its tape path.

SUMMARY

Method and apparatus are provided for counteracting tape interlayer slip in a magnetic tape drive which has a swing-arm in a tape path between a tape supply reel and a tape take-up reel. So long as an interlayer slip is not detected, the supply reel motor is driven in such a way as to control the position of the swingarm position. Upon detection of the interlayer slip, the reel motor is driven in accordance with a secondary strategy. The secondary strategy is not dependent upon the instantaneous position of the swingarm directly, but upon the velocity of the reel motor and (in a second embodiment) a filtered version of the swingarm position.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
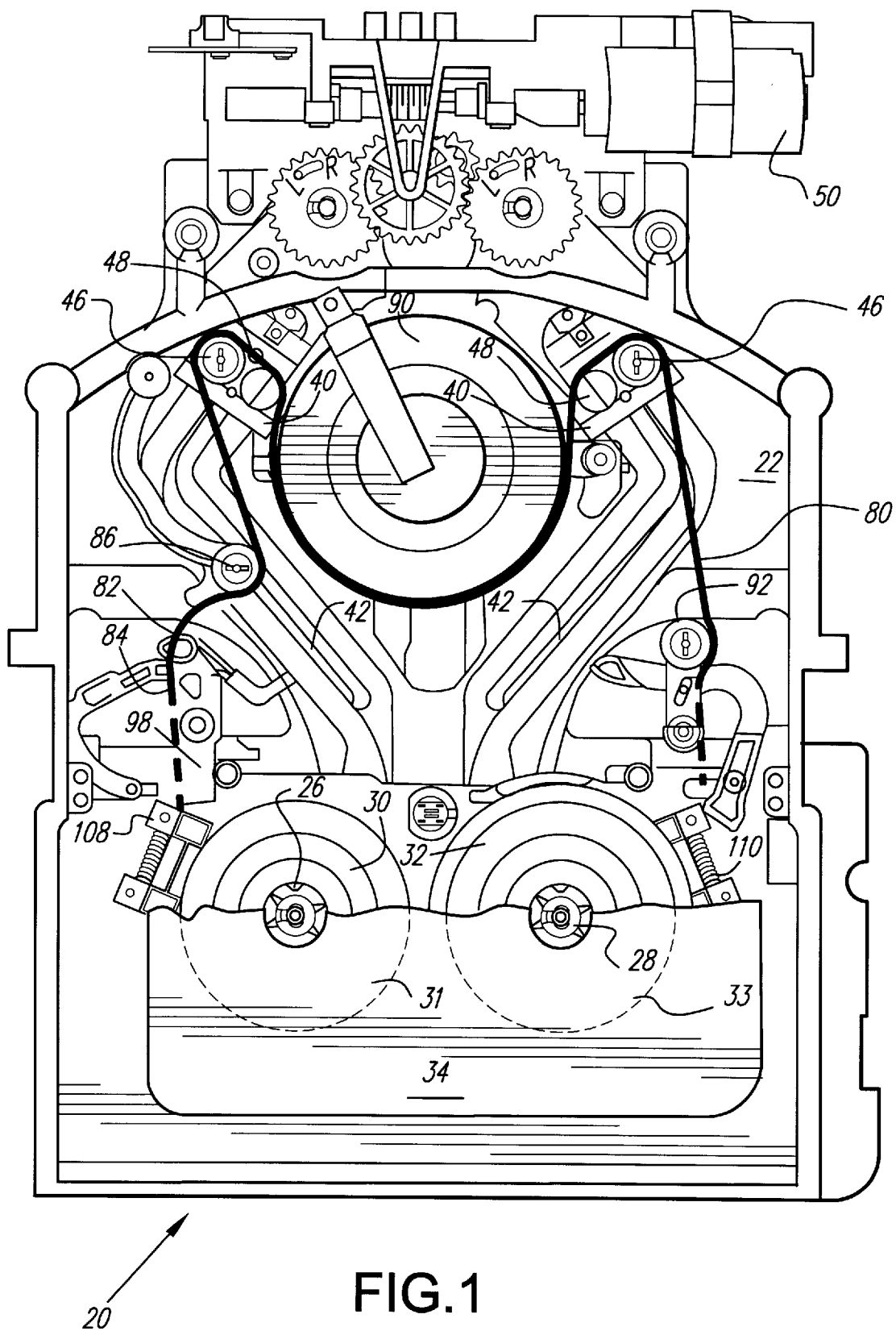
FIG. 1 is a top view of a tape drive of an embodiment of the present invention, with a tape drive housing cover removed, and showing a tape full extraction position.

FIG. 1 shows a tape drive 20 having a chassis 22 which is visible by virtue of removal of an unillustrated drive housing cover. Tape drive 20 includes a supply reel spindle 26 and a take-up reel spindle 28, which are respectively rotatably driven by supply reel motor 30 and take-up reel motor 32. When, for example, a magnetic tape cartridge is inserted into a cartridge slot in a front face of the unillustrated housing of drive 20, a supply reel 31 of the cartridge and a take-up reel 33 of the cartridge ultimately extend over spindles of respective supply reel spindle 26 and take-up reel spindle 28. Only portions of supply reel 31 and take-up reel 33 are shown in FIG. 1, in order to permit viewing of the respective reel motors 30 and 32 underneath. Similarly, only a portion of cartridge 34 is depicted in FIG. 1 for the purpose of facilitating an understanding of the underlying structure.

Details of supply reel hub 26 and a take-up reel hub 28 are shown in U.S. Pat. No. 5,602,694 for CAPSTANLESS HELICAL DRIVE SYSTEM to Robert J. Miles and James Zweighaft, which is incorporated herein by reference. Details of the supply reel motor 30 and the take-up reel motor 32 are understood with reference to one or more of the following (all of which are incorporated herein by reference): U.S. patent application Ser. No. 08/483,521 of Zweighaft et al. entitled DIGITAL ACOUSTIC NOISE REDUCTION IN ELECTRIC MOTORS DRIVEN BY SWITCHING POWER AMPLIFIERS; U.S. Pat. No. 5,426,355 to Zweighaft entitled POWER-OFF MOTOR DECELERATION CONTROL SYSTEM.

Tape drive 20 also includes two trolleys 40 which are utilized to move tape between a tape retracted position and a tape extracted position. The two trolleys 40 travel along respective trolley paths 42 which are grooves formed in chassis 22. Trolleys 40 each comprise a trolley carriage upon which tape guides 46 and 48 are mounted. A trolley motor 50 acts through the trolley transmission system to move trolleys 40 along paths 42. Details of trolleys 40, of the trolley transmission system, and operation thereof in conjunction with trolley motor 50 are disclosed in U.S. patent application Ser. No. 08/824,118 of Stricker entitled PREVENTING TAPE SLACK IN MAGNETIC TAPE DRIVE, which is simultaneously filed herewith and incorporated herein by reference.

At the tape fully extracted position shown in FIG. 1C, the tape extends around an operative tape path of tape drive 20. Line 80, as shown in FIG. 1, depicts both the tape and the operative tape path. As shown in FIG. 1, the tape extends around tape guide 82 provided on swing arm 84; around tape guide 86; around tape guides 46 and 48 of a first trolley 40; around a portion of the periphery of drum or scanner 90; around tape guides 48 and 46 of a second trolley 40; and around tape guide 92. In the fully extracted position, read and write heads mounted on the periphery of drum 90 travel along helical paths of the tape.

Some skilled in the art refer to tape extraction operation as being a tape path load operation and a tape retraction operation as being a tape path unload operation. While the present document chooses the "extraction" and "retraction" terminology primarily to avoid confusion with cartridge loading (into the drive) operations and cartridge unloading (from the drive) operations (as distinguished from tape path loading and tape path unloading), it should be understood that other terminology as such tape path load and unload can be used to describe the extraction and retraction operations of the present invention.

Figure 2A:
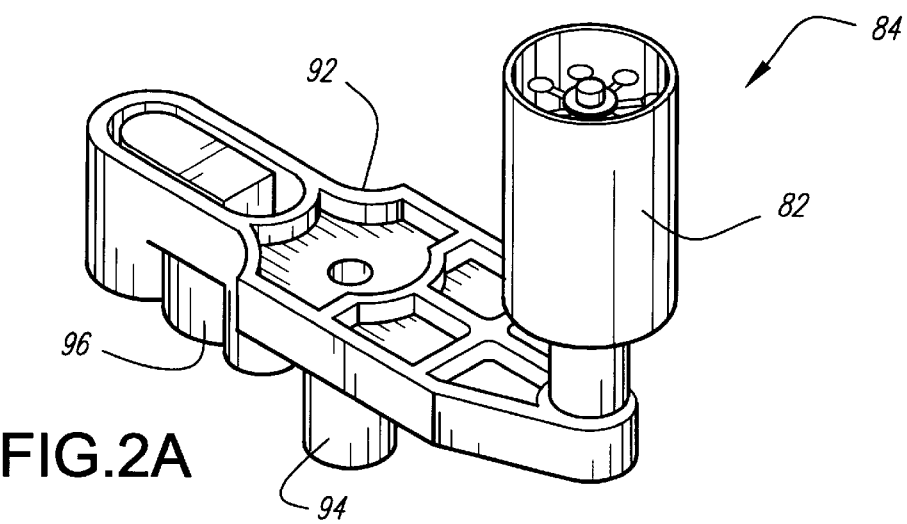
FIG. 2A is an isometric view of a swingarm of the tape drive of FIG. 1.
Figure 2B:
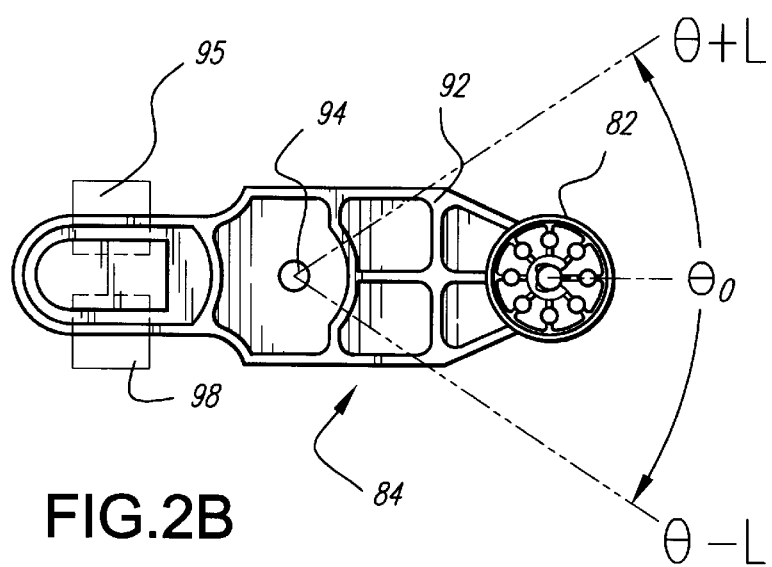
FIG. 2B is a top view of the swingarm of FIG. 2A.
Figure 2C:
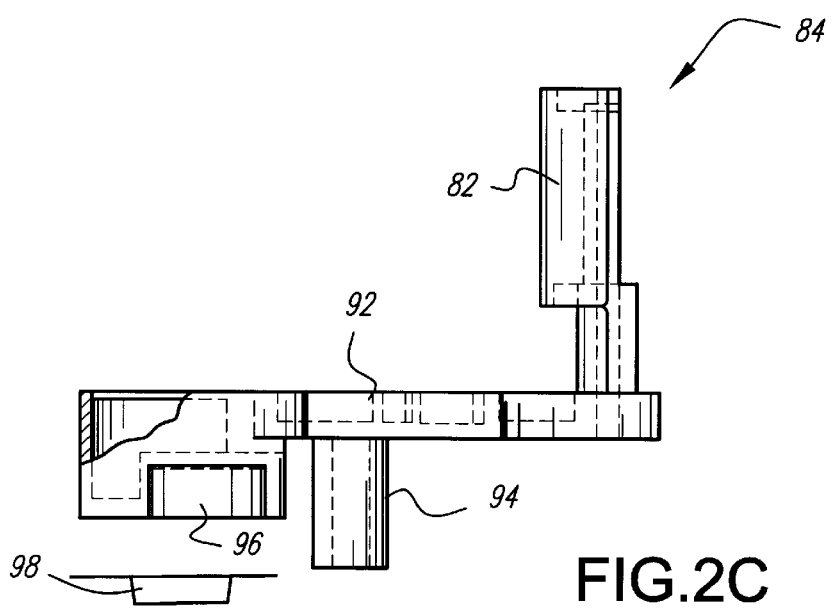
FIG. 2C is a side view, partially sectioned and partially broken, of the swingarm of FIG. 2A.
Figure 3:
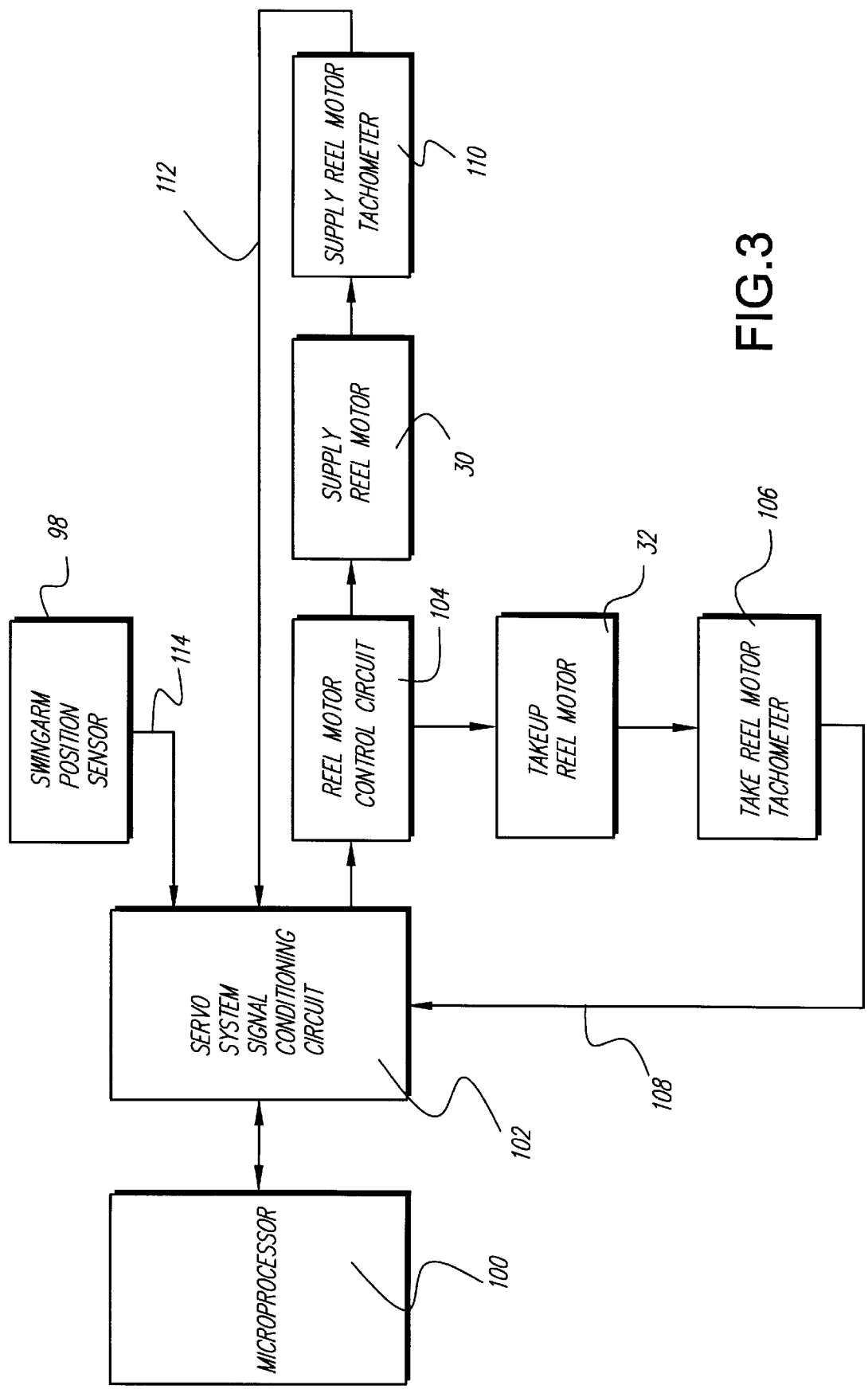
FIG. 3 is a schematic view of electronic components included in the tape drive of FIG. 1.

As described in U.S. Pat. No. 5,602,694, which is incorporated herein by reference, and illustrated in FIG. 2A, FIG. 2B, and FIG. 2C, swingarm 84 is positioned along the tape path between the supply reel and the tape guide 86. As shown in FIG. 3, swingarm 84 includes a ribbed horizontal frame member 92. Swingarm frame member 92 carries tape guide 82 at one end thereof. Bushing collar 94 depends from an underside of frame member 92 approximately mid-way between ends of frame member 92. Bushing collar 94 accommodates an unillustrated mounting shaft which extends vertically upwardly from chassis 22. By virtue of bushing collar 94, swingarm 84 pivots as necessary about the unillustrated mounting shaft. At its tail end, swingarm frame member 92 carries a magnet assembly 96 on its underside. Chassis 22 is provided with a sensor 98 beneath magnet assembly 96 for detecting the position of swingarm 84, and thus tension in the tape.

FIG. 3 shows motor and electronics components of tape drive 20 pertinent to the present invention. FIG. 2 particularly illustrates a processor 100 (shown as a microprocessor) which executes coded instructions to perform operations hereinafter described. Processor 100 works through a servo system signal conditioning circuit 102 to which it is connected. Servo system signal conditioning circuit 102 in turn controls a reel motor control circuit 104.

Supply reel motor 30 rotates in accordance with a supply motor voltage applied thereto from reel motor control circuit 104. The rotational position of supply reel motor 30, and hence of the supply reel which surmounts spindle 26, is sensed by supply reel motor tachometer 106 (see FIG. 1 and FIG. 2). Supply reel motor tachometer 106 generates a supply reel motor position signal on line 108 (2880 pulses per revolution in the illustrated embodiment). Similarly, reel motor control circuit 104 applies a voltage to take-up reel motor 32. The rotational position of take-up reel motor 32 is sensed by take-up reel motor tachometer 110 which generates a take-up reel motor position signal on line 112 (2880× 8.14 pulses per revolution in the illustrated embodiment). Tachometers 106 and 110 are two phase type sensors that also yield directional information on every pulse. The position information ascertained from tachometers 106 and 110 are combined with timing information to determine $\theta'_s$ the angular velocity of supply reel motor 30 ($\theta'_s$) and the angular velocity of take-up reel motor 30 ($\theta'_T$), respectively.

Despite the fact that supply reel 31 and take-up reel 33 are clearly connected by the tape between them, processor 100 evaluates independent control equations for each reel motor 30, 32, respectively. When tensioned, the supply reel control system looks only at the position of supply reel 31 and controls only the voltage applied to supply reel motor 30, regardless of tape speed. As long as the rate of acceleration is low and the effect of back-emf is minimal, the supply reel control system is unaffected by tape speed. In effect, the supply reel 31 pulls counter clockwise regardless of what the tape-up reel 33 is doing. An exception to this generalization occurs during high speed forward operation when the drag in the tape path is high enough to pull the swingarm tauter, but the control system responds by pushing clockwise a little to relieve the tension. Similarly, take-up reel 33 can perform any of its actions—accelerate, stop, go forwards and backwards—regardless of performance of supply reel 31. As long as supply reel 33 does its job, take-up reel 31 sees a fairly constant drag (albeit slightly more when going forward).

Sensor 98, mounted beneath swingarm 84 in order to sense the magnetic flux of magnet assembly 96, is a Hall Effect sensor. As shown in FIG. 2B, swingarm 84 can pivot about bushing 94 from a center position (depicted as $\theta_O$) to extreme limit positions (depicted as $\theta_L$ and depicted as $\theta_{-L}$). In accordance with the angular position of swingarm 84 about bushing 94, sensor 98 generates a signal indicative of angular position $\theta_{arm}$ relative to center position $\theta_O$. FIG. 3 shows such a signal indicative of angular position $\theta_{arm}$ being applied on line 114 to servo system signal conditioning circuit 102.

In the following discussion, the invention is illustrated as controlling only the torque $\tau_S$ of supply reel motor 30. This is because some tape drives are particularly prone to interlayer slip during a rewind operation, during which control of the supply reel motor is important. However, it should be understood that the velocity of either one or both of supply reel motor 30 and take-up reel motor 32 can be controlled by the principles of the present invention.

During on-going tape movement, and as indicated by step S1, processor 100 determines whether an interlayer slip is occurring by evaluating Equation 1:

$$\theta'_S R_S \approx \theta'_T R_T \qquad \text{Equation 1}$$

In Equation 1, $\theta'_s$ is the angular velocity of supply reel motor 30, $R_s$ is the radius of the tape pack on the supply reel, $\theta'_T$ is the angular velocity of take-up reel motor 30, and $R_T$ is the radius of the tape pack on the take-up reel. For an interlayer slip not to occur, Equation 1 should be satisfied, at least within a predetermined tolerance range. That is, so long as the amount of tape coming off each reel is in approximate balance, there is no tape speed speed mismatch.

Processor 100 evaluates Equation 1 using the supply reel motor position signal $\theta_s$ (generated by supply reel motor tachometer 110 and applied to servo system signal conditioning circuit 102 on line 108) and the take-up reel motor position signal $\theta_T$ (generated by tachometer 110 and applied to servo system signal conditioning circuit 102 on line 112). Using these signals as forwarded to it over time from servo system signal conditioning circuit 102, processor 100 determines $\theta'_s$ and $\theta'_T$. Processor 100 also uses the signals $\theta_s$ and $\theta_T$, as well as information gained during the tape extraction process, to determine $R_S$ and $R_T$ in accordance with any of a number of prior art techniques. Then, knowing the values of all factors of Equation 1, processor 100 can determine whether the left side and right side thereof are in reasonable approximation, e.g., are within an acceptable tolerance range of one another and thus no tape speed mismatch.

Figure 4:
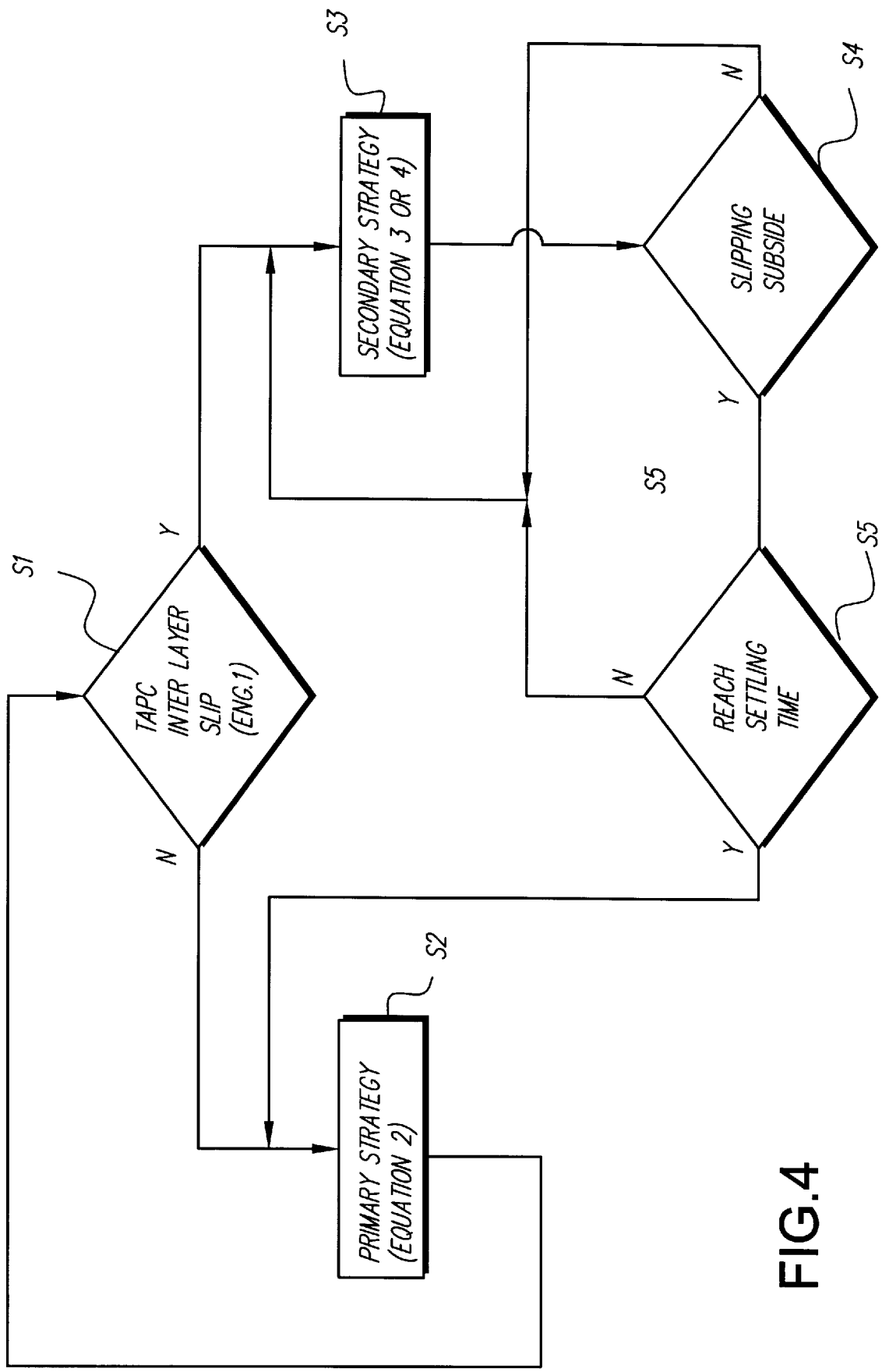
FIG. 4 is a flowchart showing operations executed in accordance with an embodiment of the invention.

So long as the left side and right side of Equation 1 are in reasonable approximation, processor 100 adopts a primary strategy for controlling the torque $\theta_S$ of supply reel motor 30 as indicated by step S2 of FIG. 4. Employment of the primary strategy involves evaluating Equation 2 or, in another embodiment, Equation 2A:

$$\tau_S = k_p(\theta_{ref} - \theta_{arm}) + k_v \theta'_{arm} \qquad \text{Equation 2}$$

$$\tau_S = k_p(\theta_{ref} - \theta_{arm}) + k_v \theta'_{arm} + k_i \int(\theta_{ref} - \theta_{arm})dt \qquad \text{Equation 2A}$$

In Equation 2 (used for proportional-derivative [PI] control), $k_p$ is a position constant, $\theta_{ref}$ is a reference angular position of swingarm 84, $\theta_{arm}$ is the actual angular position of swingarm 84 as sensed by sensor 98, $k_v$ is a velocity constant, and $\theta'_{arm}$ is the derivative of $\theta_{arm}$, i.e., the angular velocity of swingarm 84. Equation 2A (used for proportional-derivative-integral [PID] control) differs from Equation 2 only in having a third term which is included to reduce steady state error. Hereinafter, reference to Equation 2 should be understood to refer either to Equation 2 or to Equation 2A in accordance with whether PD or PI control is desired.

Equation 2 is evaluated by processor 100 upon receipt of the signal for $\theta_{arm}$ (from servo system signal conditioning circuit 102 and ultimately from sensor 98 on line 114). Receipt of values of $\theta_{arm}$ over time enables processor 100 to determine $\theta'_{arm}$ i.e., the angular velocity of swingarm 84, and to solve Equation 2. Upon solving Equation 2, processor 100 outputs a supply reel drive signal via servo system signal conditioning circuit 102 to reel motor control circuit 104, which supply reel drive signal causes supply reel motor 30 to rotate at an the angular velocity that keeps the swingarm position within an acceptable range, thus controlling tape tension.

Processor 100 periodically checks for interlayer slip (step S1), e.g., in the illustrated embodiment at a rate of 250 times per second. A tension problem is detected when the left side and right side of Equation 1 are not in reasonable approximation, i.e., the left side and right side differing by more than a predetermined tolerance amount (e.g, about 5%). An interlayer slip is indicated when $\theta'_S R_S \ll \theta'_T R_T$.

When $\theta'_S R_S \gg \theta'_T R_T$, on the other hand, a tape loop occurs (e.g., too much tape in the tape path). In the situation of a interlayer slip occurring in a tape rewind, the linear rotational speed of the take-up reel motor 32 will exceed that of the supply reel motor 30 by more than the predetermined tolerance amount.

When, in connection with step S1, processor 100 determines that tape speed mismatch falls below a particular tolerance value, an interlayer slip is detected. Upon detection of an interlayer slip at step S1, processor 100 conducts an alternate or secondary strategy to determine a proper value for $\tau_S$ as reflected by step S3 of FIG. 4. In particular, for one embodiment of the invention, at step S3 processor 100 evaluates Equation 3 for torque $\tau_S$ rather than Equation 2.

$$\tau_S = K - K_{slip} \theta'_S \qquad \text{,Equation 3:}$$

In Equation 3, K and $k_{slip}$ are constants and $\theta'_s$ is the velocity of supply reel motor 30. Constant K represents the voltage required for application to the reel motor to obtain reasonable tension on the tape (e.g, 12 grams during rewind). The constant $k_{slip}$ is chosen to avoid tape damage caused by cinching too quickly.

During an interlayer slip, swingarm 84 can oscillate considerably and thereby present a problem. Therefore, in another embodiment, upon determining that an interlayer slip has occurred, at step S3 processor 100 evaluates Equation 4 for torque $\tau_S$ rather than Equation 2.

$$\tau_S = K - k_{slip} \theta'_S + k_{fil} F(\theta_{arm}) \qquad \text{Equation 4:}$$

Equation 4 differs from Equation 3 by having a third term, particularly filtering term $k_{fil} F(\theta_{arm})$. In the filtering term of Equation 4, $k_{fil}$ is a constant, and F is a low pass filtering function which is dependent upon $\theta_{arm}$ (the actual angular position of swingarm 84 as sensed by sensor 98) and attenuates the high frequency components of swingarm position sensor 98. During interlayer slip, the average position of swingarm 84 sags a bit from the average maintained before interlayer slip and after the interlayer slip subsides. However, as a result of utilization of Equation 4 in connection with the secondary strategy, precludes a large variation in the average position of swingarm 84.

Filter function F serves to obtain an average angular position of swingarm 84, which is indicative of average tape tension. Equation 5 can apply for filter function F.

$$F(\theta_{arm}(n)) = [15 * F(\theta_{arm}(n-1)) + \theta_{arm}(n-1)]/16 \qquad \text{Equation 5:}$$

In Equation 5, "n" refers to the value of some signal "at time n", while "n−1" refers to the value of the signal at the previous time sample (e.g., 0.004 seconds earlier in the illustrated embodiment). The constants listed are for illustration purposes only. Those skilled in the art will recognize Equation 5 is being a simple digital low-pass filter.

Filter function F thus precludes excessive or low tension during the efforts of step S3 to counteract the interlayer slip. That is, for example, the filtering term of Equation 4 precludes supply reel motor 30 from pulling the tape at such a high velocity that the tape might be damaged. Constant $k_{fil}$ of the filtering term is chosen based on the observed mechanical characteristics of the slipping tape pack.

Thus, in shifting at step S3 from utilization of Equation 2 to utilization either of Equation 3 or Equation 4, processor 100, in determining the desired torque $\tau_S$ of supply reel motor 30, changes from a strategy dependent solely upon swingarm position to a secondary strategy. In particular, the secondary strategy, as reflected by Equation 3, is dependent upon the velocity of supply reel motor 30. In the embodiment involving Equation 4, the secondary strategy is dependent not only upon the velocity of supply reel motor 30, but also upon the filtering term.

At step S4 of FIG. 4 processor 100, using Equation 1, determines if tape slipping has subsided. If so, at step S5 processor 100 notes the value of the counter and determines a settling time ST based on a predetermined number of counts after time SS. If, as indicated by step S5, the settling time ST is reached without further tape slipping (e.g., without exceeding the tolerance of the tape speed mismatch of Equation 1), the primary strategy of step S2 is implemented. If the determination at either step S4 or S5 is negative, the secondary strategy remains in effect.

Thus, in the present invention, if an interlayer slip is detected, processor 100 changes the method from one in which the supply reel motor 30 drive voltage is calculated based solely upon the location of swingarm 84 to one dependent upon the speed of the supply reel. The applied voltage is calculated so that the torque of the supply reel will always be counterclockwise (e.g., in the direction that cinches up the interlayer slip), and limited so that the rate of slip will not be undesirably high. As the interlayer slip subsides, processor 100 switches back to its primary strategy of calculating the voltage of the supply reel motor 30 based solely on the location of swingarm 84.

Features of the present invention are compatible with the invention described in simultaneously-filed U.S. patent application Ser. No. 08/824,869 of Zweighaft, entitled "METHOD AND APPARATUS FOR COUNTERACTING TAPE WEAR DURING DWELL TIME IN A HELICAL SCAN MAGNETIC TAPE DRIVE", which is incorporated herein by reference.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A magnetic tape drive which transduces information with respect to magnetic tape, the magnetic tape extending along a tape path between a tape supply reel and a tape take-up reel, a swingarm which contacts the tape extending along the tape path to detect tape tension being provided in the tape path, the drive comprising:

a reel motor for rotating the tape supply reel;

a processor which drives the reel motor in accordance with a primary strategy related to a position of the swingarm so long as an interlayer slip in the supply reel is not detected, and upon detection of the interlayer slip drives the reel motor in accordance with a secondary strategy for overcoming the interlayer slip and permitting continued operation of the magnetic tape drive.

2. The apparatus of claim 1, wherein the secondary strategy is dependent upon the velocity of the reel motor.

3. The apparatus of claim 1, wherein the primary strategy involves (1) determining a value related to a difference between a reference angular position of the swingarm and an actual angular position of the swingarm; and (2) adding a value related to an angular velocity of the swingarm to the value determined at (1).

4. The apparatus of claim 1, wherein the secondary strategy is dependent upon the velocity of the reel motor and the position of the swingarm.

5. A magnetic tape drive which transduces information with respect to magnetic tape, the magnetic tape extending along a tape path between a tape supply reel an a tape take-up reel, a swingarm which contacts the tape extending along the tape path to detect tape tension being provided in the tape path, the drive comprising:

a reel motor for rotating the tape supply reel;

a processor which drives the reel motor in accordance with a primary strategy related to a position of the swingarm so long as an interlayer slip in the supply reel is not detected, but which upon determination of the interlayer slip drives the reel motor in accordance with a secondary strategy for overcoming the speed mismatch and permitting continued operation of the magnetic tape drive.

6. The apparatus of claim 5, wherein the secondary strategy is dependent upon the velocity of the reel motor and the position of the swingarm.

7. The apparatus of claim 5, wherein the secondary strategy is dependent upon the velocity of the reel motor.

8. The apparatus of claim 5, wherein the primary strategy involves (1) determining a value related to a difference between a reference angular position of the swingarm and an actual angular position of the swingarm; and (2) adding a value related to an angular velocity of the swingarm to the value determined at (1).

9. A method of operating a magnetic tape drive which transduces information with respect to magnetic tape, the magnetic tape extending along a tape path between a tape supply reel and a tape take-up reel, a swingarm which contacts the tape extending along the tape path to detect tape tension being provided in the tape path, the method comprising driving a reel motor for the tape supply reel in accordance with a primary strategy related to a position of the swingarm so long as an interlayer slip is not detected, and upon detection of the interlayer slip in the supply reel driving the reel motor in accordance with a secondary strategy for overcoming the speed mismatch and permitting continued operation of the magnetic tape drive.

10. The method of claim 9, wherein the primary strategy involves (1) determining a value related to a difference between a reference angular position of the swingarm and an actual angular position of the swingarm; and (2) adding a value related to an angular velocity of the swingarm to the value determined at (1).

11. The method of claim 9, wherein the secondary strategy is dependent upon the velocity of the reel motor and the position of the swingarm.

12. The method of claim 9, wherein the secondary strategy is dependent upon the velocity of the reel motor.

13. A method of operating a magnetic tape drive which transduces information with respect to magnetic tape, the magnetic tape extending along a tape path between a tape supply reel and a tape take-up reel, a swingarm which contacts the tape extending along the tape path to detect tape tension being provided in the tape path, the method comprising:

driving a reel motor in accordance with a primary strategy related to a position of the swingarm so long as an interlayer slip in the supply reel is not detected; and upon determination of the interlayer slip, driving the reel motor in accordance with a secondary strategy for overcoming the interlayer slip and permitting continued operation of the magnetic tape drive.

14. The method of claim 13, wherein the secondary strategy is dependent upon the velocity of the reel motor.

15. The method of claim 13, wherein the primary strategy involves (1) determining a value related to a difference between a reference angular position of the swingarm and an actual angular position of the swingarm; and (2) adding a value related to an angular velocity of the swingarm to the value determined at (1).

* * * * *